United States Patent [19]

Eckersley

[11] Patent Number: 5,420,487
[45] Date of Patent: May 30, 1995

[54] CONTROL SYSTEM FOR A MOTOR

[75] Inventor: Gregory P. Eckersley, Kew, Australia

[73] Assignee: Boral Johns Perry Industries PTY. Ltd., Cheltenham, Australia

[21] Appl. No.: 31,481

[22] Filed: Mar. 15, 1993

Related U.S. Application Data

[62] Division of Ser. No. 700,137, May 24, 1991, Pat. No. 5,225,754.

[30] Foreign Application Priority Data

Dec. 6, 1988 [AU] Australia ................ PJ1810

[51] Int. Cl.⁶ ........................... H02P 5/40; B66B 1/30; H03K 17/00
[52] U.S. Cl. ................................... 318/560; 318/800; 318/808; 395/250
[58] Field of Search ................ 318/560–646, 318/800–820, 780–799; 187/100–136; 395/250; 364/DIG. 1, DIG. 2, 239, 239.1, 239.3, 926.1, 927.92, 927.93

[56] References Cited

U.S. PATENT DOCUMENTS

| | | | |
|---|---|---|---|
| 3,586,176 | 6/1971 | Rackman | 214/6 |
| 3,674,996 | 7/1972 | Yanagidaira et al. | 235/154 |
| 3,684,880 | 8/1972 | Togawa et al. | 235/186 |
| 3,707,662 | 12/1972 | Hoffman | 318/578 |
| 4,109,312 | 8/1978 | Beutel | 364/508 |
| 4,125,798 | 11/1978 | Miller | 318/574 |
| 4,249,117 | 2/1981 | Leukhardt et al. | 318/275 |
| 4,346,434 | 8/1982 | Morinaga | 318/341 |
| 4,477,763 | 10/1984 | Asano et al. | 318/811 |
| 4,543,635 | 9/1985 | Joo et al. | 364/474 |
| 4,677,361 | 6/1987 | Yonemoto | 318/805 |
| 4,737,905 | 4/1988 | Yoshida et al. | 364/190 |
| 4,745,991 | 5/1988 | Tanahashi | 187/119 |
| 4,780,657 | 10/1988 | Brown et al. | 318/805 |
| 4,953,145 | 8/1990 | Carlson | 367/138 |
| 5,003,243 | 3/1991 | Tadakuma et al. | 318/800 |
| 5,038,092 | 8/1991 | Asano et al. | 318/811 |
| 5,047,915 | 9/1991 | Smith et al. | 363/161 |
| 5,097,218 | 3/1992 | Cooper | 328/15 |
| 5,184,310 | 2/1993 | Takenouchi | 318/811 X |

Primary Examiner—Paul Ip

[57] ABSTRACT

A controller for a motor for raising and lowering a lift car in a lift well is disclosed which comprises transistor bridge circuits (10) for providing power to said motor (m), a first processor having a multiplexer (54) for passing one of a plurality of signals containing data relating to the state of said transistor bridge circuits (10) to an analogue to digital converter (38) for converting analogue signals to digital signals and providing said digital signals to a main processor (70), a polar conversion circuit (78) for receiving said signals from said transistor bridge circuits (10) and for converting the signals into signals having a magnitude and a phase component, an overcurrent sensor (85) for sensing whether the current supplied by the transistor bridge circuits (10) is too high, said overcurrent and sensor circuit being coupled to a pulse modulator circuit (87) for controlling the pulse width of the signal applied to the transistors in said transistor bridge circuits, and a second processing circuit comprises a multiplexer arrangement (100) for receiving data relating to the status of said motor or the power supplied by said transistor bridge circuits (10) and for converting streams of parallel data signals into a serial stream of data signal and then reconstructing the original parallel data signals for application to the main processor (70).

3 Claims, 8 Drawing Sheets

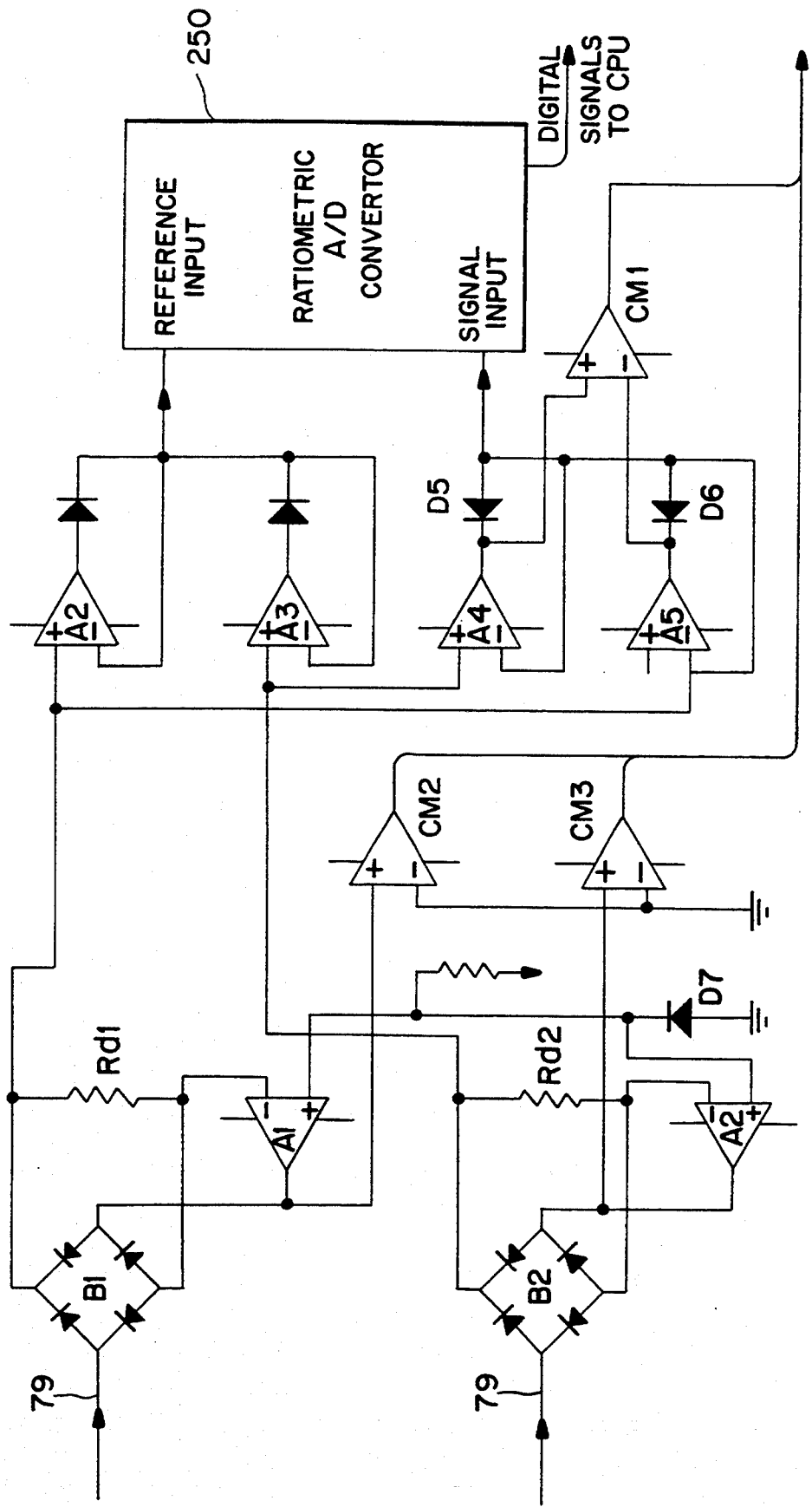

CONTROL SYSTEM FOR A MOTOR

This application is a divisional of application Ser. No. 07/700,137, filed on May 24, 1991, now U.S. Pat. No. 5,225,754, issued Jul. 6, 1993, the entire contents of which are hereby incorporated by reference.

FIELD OF INVENTION

This invention relates to a control system for a motor and, in particular, to a synchronous servo motor controller for controlling a synchronous servo motor used to raise and lower lift cars in a lift well.

SUMMARY OF THE INVENTION

The invention in a first aspect may be said to reside in a controller for a motor for raising and lowering a lift car in a lift well, said controller comprising drive circuit means for providing power to said motor, first processing means for receiving data relating to the state of said motor and for processing that data, second processor means for receiving information from said drive means concerning the state of said drive means and for processing that information and main processing means for receiving information from the first and second processing means and for analyzing the information provided by the first and second processing means and controlling said drive circuit and/or said motor in accordance with that information.

Preferably the drive means includes a plurality of transistor bridge circuits.

Preferably the first processor means comprises switch means for passing one of a plurality of signals containing data relating to the state of said transistor bridge circuits to an analogue to digital converter for converting analogue signals to digital signals and providing said digital signals to said main processor, a polar conversion circuit for receiving said signals from said transfer bridge circuits and for converting the signals into signals having a magnitude and a phase component and an overcurrent sensor for sensing whether the current supplied by the transistor bridge circuits is too high, said overcurrent and sensor circuit being coupled to a pulse modulator circuit for controlling the pulse width of the signal applied to the transistors in said transistor bridge circuits.

Preferably the second processing circuit comprises a multiplexer arrangement for receiving data relating to the status of said motor or the power supplied by said drive circuit and for converting streams of parallel data signals into a serial stream of data signal and then reconstructing the original parallel data signals for application to said main processing means.

Preferably the main processing means comprises a central processor coupled to a control circuit which ensures that the central processor operates correctly.

The invention also provides a circuit to convert from rectangular to polar co-ordinates for use in a controller to control a motor for raising and lowering a lift car, said circuit comprising at least two inputs for receiving signals indicative of the angular position of currents and/or voltages applied to said motor, or of the angular position of a motor shaft, circuit means for comparing said two signals for performing arithmetic operations upon said signals based upon said comparison to convert the signals to polar signals having a magnitude and a phase component.

The conversion of the signals from rectangular co-ordinates to polar co-ordinates decreases the amount of time consumed by the main processor during input signal processing and also assists in scaling of the values to be processed by the processor.

Preferably, the comparing circuit determines which is the greater of the modules of the two input signals and converts the input signals into a single current vector in polar co-ordinates which have said magnitude and said phase components and expresses said phase component as an inverse tangent of the quotient of the two input signals by dividing the smaller of the input signals by the larger of the signals.

Another aspect of the invention concerns isolating signals representing voltages produced by the drive circuit and applied to the motor from the processing circuitry in the controller. Although the controller is mainly concerned with difference between voltages, the absolute voltages which are involved are high and could damage the processing circuitry if applied directly to the processing circuitry.

The present invention therefore also includes an isolator for use in a control circuit for controlling a motor for raising and lowering a lift in a lift well, said isolator comprising a transformer, a first switch coupled to one winding of said transformer and a second switch coupled to the second winding of said transformer, said first switch and said second switch being controlled by a control means so as to switch states to selectively apply said signals to opposite ends of said windings so that the output from the second winding follows the input to the first winding to thereby construct the data signal whilst isolating a processing means to be coupled to the secondary winding from input voltage signals to be applied to the first winding.

A further aspect of the invention provides a device for determining the angular position of the motor, said device comprising a first plate coupled to a power supply system, a plurality of second plates coupled to a moving part of said motor and a plurality of third plates arranged stationary relative to said plurality of second plates, the number of third plates being greater than the number of second plates, said plurality of third plates being coupled to one winding of at least one transformer and a circuit means being coupled to the other winding of said at least one transformer, wherein when said motor moves said second plates move between said first plate and said plurality of third plates thereby continually altering the electric flux and therefore the current applied to said plurality of third plates, said circuit means in use receiving said signal from said power supply to provide a reference signal, and a signal induced in the second winding of said transformer together with said reference signal being combined by said circuit means to provide an output voltage indicative of said angular position of said motor.

Preferably, said circuit means is a balanced modulator circuit and said device includes a pair of transformers coupled to said plurality of third plates and each transformer having a balanced modulator circuit which receives the signal from the power supply circuit and respective signals from the second winding of said transformers, said balanced modulators producing quadrature signals to provide an indication of the angular position of said motor.

A further aspect of the invention concerns the receipt and processing of data signals which relate to the state of the power supply for said motor and also to operating parameters of said motor such as the angular position and the like.

In view of the large number of signals which are detected and processed, it is desirable to provide a system for conveniently and simply transferring those signals from the sensors to a processor.

The invention may also be said to reside in a device for receiving and transferring a plurality of signals, said device comprising a plurality of input means for producing said signals, said converters being coupled to a register means such that signals from each of said converters are received in said register means and outputted from said register in serial form, transfer means for transferring said serial signal from said register means to second register means, at least one memory means for receiving data from said second register means and address means for addressing said memory means for causing said memory means to reconstruct said data in the form in which it is loaded into said plurality of input means so that said data outputted from said memory means is reconstructed into the form in which it is loaded into said converter means.

Preferably said input means are converters or digital signal input circuits.

Preferably two memories are provided and the data from said second register means is loaded into each of said memories, switch means for switching between said memory so that one memory receives data from said second register means while the second memory outputs data, second switch means connected to the output of said memory means for switching between said first and second memories so that data outputted from said memories is selectively applied to a third register means.

BRIEF DESCRIPTION OF THE INVENTION

The invention will be described by way of example with reference to a preferred embodiment shown in the accompanying drawings in which:

FIG. 7 is a circuit diagram of a second embodiment of the block diagram shown in FIG. 2.

DETAILED DESCRIPTION OF THE PREFERRED EMBODIMENTS

Figure 1A:
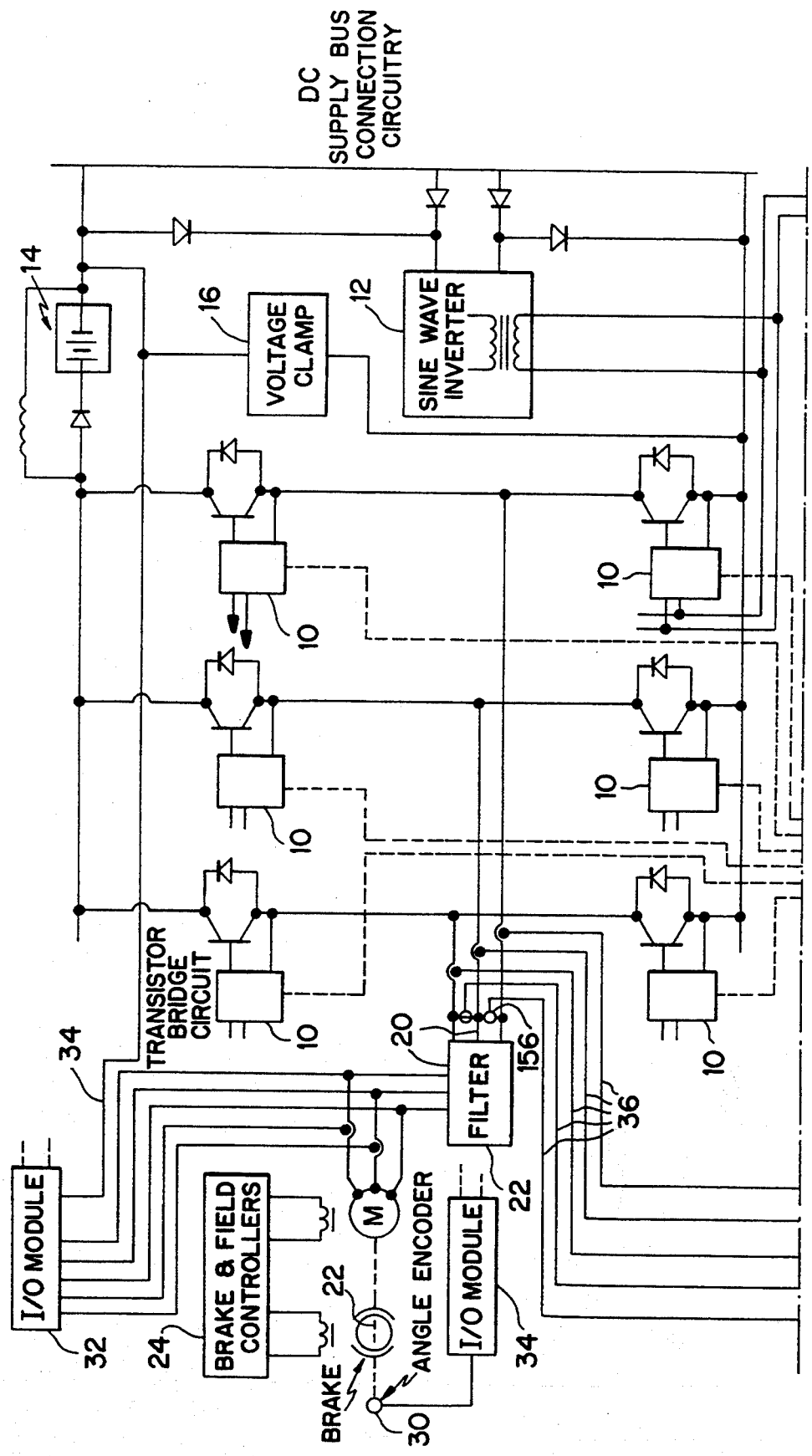
FIGS. 1A and 1B are block diagram of a controller for a servo motor for raising and lowering a lift car in a lift well.
Figure 1B:
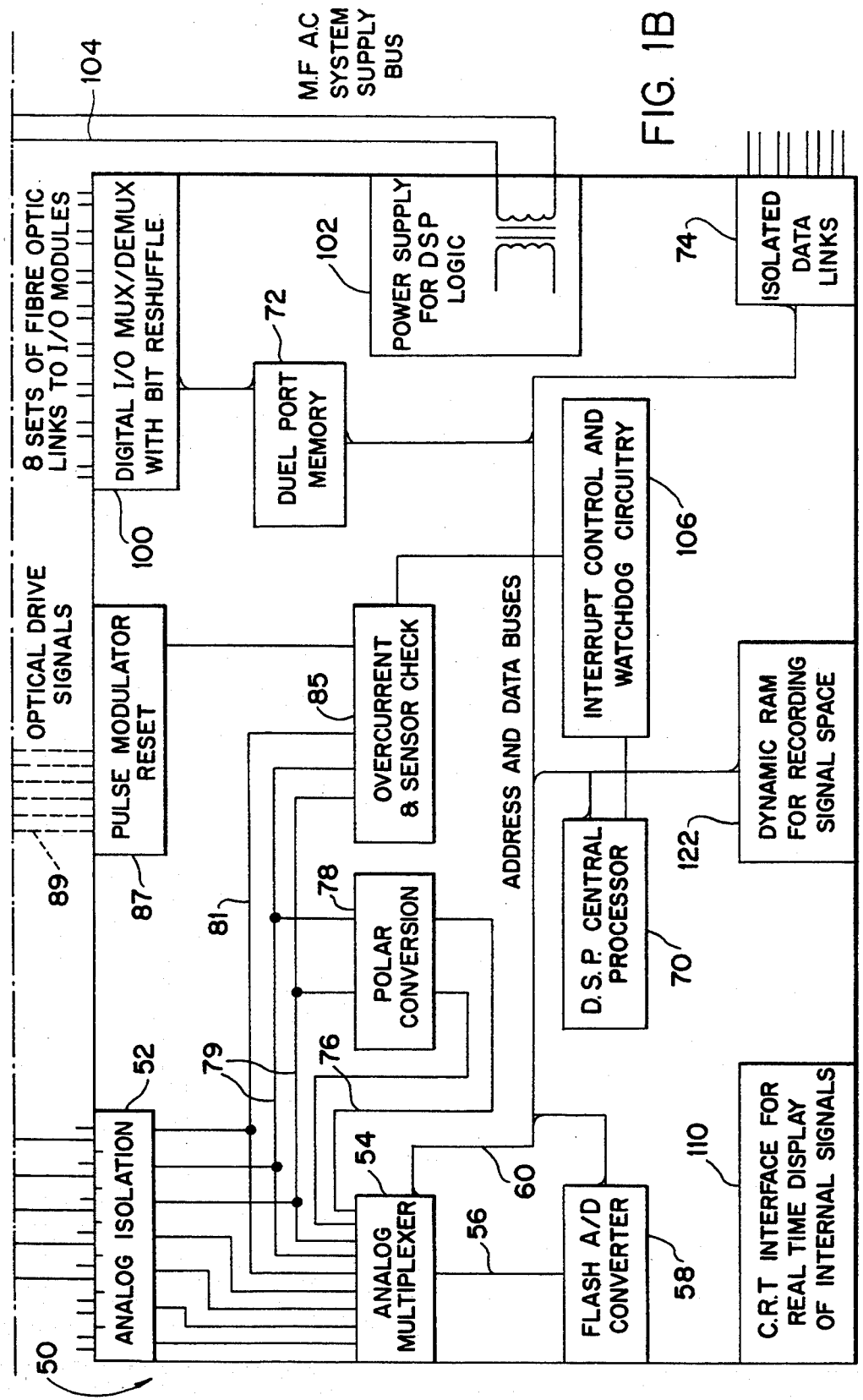

With reference to FIGS. 1A and 1B the controller includes six transistor bridge circuits 10 which are powered from a DC supply via a sine wave generator 12 and an oscillator circuit 14. The transistor bridge circuits 10 are well known and therefore will not be described in further detail. A voltage clamp 16 is arranged parallel to the voltage supply. The output from the transistor bridge circuits is used to power the motor M and power is supplied to the motor M on lines 20 after being filtered by a filter 23. The motor M is provided with a brake 22 and brake and field controllers 24. The motor M, brake 22, and brake and field controllers 24 are preferably of the type disclosed in our Australian Patent Application No. 64611/86 (corresponding to U.S. Pat. No. 4,739,969). The subject matter of that application is incorporated herein by this reference.

The motor M is provided with a device 30 for determining the angular position of the motor. The device 30 will be described in detail with reference to FIG. 4. An input/output module 32 is coupled to the lines 20 between the filter 22 and the motor M for providing data signals indicative of the power supply to the motor. The input/output module 32 also supplies a signal indicative of the power supply to the oscillator 14 on line 34 for control of the oscillator 14.

The output from the device 30 is supplied to an input/output module 34 for supplying data signals to a processor section 50. Lines 20, prior to filter 22, are also coupled to processor section 50 via lines 36 to provide further data for analysis. The data signals provided by the input/output modules 32 and 34 together with the data signals on lines 36 enable the processor section of the controller to monitor the power supplied to the motor M and also the operation of the motor M and to provide control signals for controlling the power supply and the motor M if necessary.

The lines 36 are connected to an analogue isolator 52 which will be described in more detail with reference to FIG. 3.

The analogue isolator is used to isolate the processing section 50 from the high voltage signals applied to lines 157. Each line 36 shown in FIG. 1 represents five lines 157 which are shown in FIG. 3. Although the processing section 50 is primarily concerned with difference between voltage signals, which may be relatively small, the actual voltage signals applied on the lines 36 are high and may damage the processing section if not isolated. The signals are applied by the analogue isolator 52 to a multiplexer 54 which selects the signal lines, in turn, and applies information on the selected line to a flash analogue digital converter 58 via line 56. The converter 58 and the multiplexer 54 are coupled to address and data bus lines 50 which are coupled to central processing unit 70 so that the converter 58 and multiplexer 54 are controlled by the unit 70. A dual port memory 72 and isolator data links 74 are also connected to bus 60. The appropriate data lines from the analogue isolator 52 which carry information as to power supplied to the motor M, are applied to a polar conversion circuit 78 on lines 79. The polar conversion circuit 78 converts rectangular co-ordinates of the angular position of the motor into polar co-ordinates and then transfers the polar co-ordinates to the multiplexer 54 on lines 76 for application to the central processing unit 70. The conversion of rectangular co-ordinates into polar co-ordinates reduces the amount of input signal processing required in the central processing unit 70. The signals which provide information concerning the power supplied to the motor M are also applied by lines 79 together with a line 81 to an overcurrent and sensor check circuit 85. The overcurrent and sense circuit 85 detects abnormally high currents and is coupled to a pulse modulator 87 which controls the pulse width applied to the transistors in the transistor bridge circuits 10 to thereby control the power supplied by the transistor bridge circuits 10 to the motor M. The pulse modulators 87 are coupled to the transistor bridge circuits 10 by lines 89 shown in dotted form.

The data signals provided to the input/output modules 32 and 34 are supplied to a multiplex/demultiplex circuit 100 which will be described in more detail with reference to FIG. 5.. Preferably the input/output modules 32 and 34 are coupled by fibre optic links and the purpose of the circuit 100 is to enable the large number of input data signals to be rearranged into a serial stream and transmitted by means of a single optical link. Power supply for the processor circuit 70 is by a supply 102 which is coupled by lines 104 to the transistor bridge circuits 10. In the drawings, only one of the transistor bridge circuits 10 is shown coupled to the power supply 102 by lines 104. However, each of the circuits is coupled to the power supply 102 in the same manner. The processing unit 50 also includes a control circuit 106 which is coupled to the central processor 70 and also to the overcurrent sensor 85 to ensure that the processor 70 and overcurrent sensor 85 operate in a correct manner and provide the appropriate data to the pulse modulator 87 and the circuit 100 for controlling the motor M and the transistor bride drivers 10.

The processing unit 50 may also include a display 110 for displaying information inputted or outputted from the processor and a recorder 112 for recording a signal trace in respect of data inputted and outputted from the processor 70.

Thus, by receiving data signals relating to the state of the power supply and also parameters of the motor such as the angular position of the motor, the processing unit 50 can analyse that data and control the power supply by controlling the transistor bridge drivers 10 so that the motor M is correctly operated and therefore the lift car is smoothly and correctly moved in a lift well.

Signals received from the device 30 via the input/output module are applied to the multiplex/demultiplex circuit 100. The speed of those signals is such that they generally do not require conversion to polar co-ordinates and therefore they need not be converted in the circuit 78. However, if conversion is required the conversion could be done by the processor 70. Alternatively, the signals from the device 30 could be supplied directly to the analog isolator 52 and switched via the multiplexer 54 to the polar conversion circuit 78 for conversion into polar co-ordinates.

The circuit for converting rectangular co-ordinates to polar co-ordinates will be described with reference to FIG. 2. The circuit 78 has two inputs on lines 79 which relate to the angular position of the current or voltage signals applied to the motor or to the angular position of the motor shaft. The inputs are, if not quadrature signals, applied to four arrays of resistive circuits 130, 131, 132, and 133. The two sets of signals are then summed in summing circuits 135 and 136 and compared in a comparative block circuit 137. The comparative block circuit 137 compares the modulus of the two signals which are labelled X and Y in FIG. 2 to produce an octant code outputted on lines 139. The signals X and Y are also received by arithmetic circuits 141 and 142 which effectively performs a logarithmic operation on the signals and provides output to circuit 143 which forms the quotient of the two logarithmic signals to provide an output on line 144. The comparative block circuit 137 is used to determine which is the larger of the values of the modulus of X or Y so that the smaller value is divided by the larger value in determining the quotient. Logarithmic and antilogarithmic functions in circuits 141 and 142 are implemented by using the matched logarithmic characteristics of monolithic bipolar transistors. If desired the circuits 137, 141, 142 and 143 can be integrated into a single circuit. Thus, the input signals which are in the form of bridge phase currents are converted into a signal current vector in polar co-ordinates with a magnitude and a phase component. The phase component is expressed as the inversed tangent of the quotient of the two derived current values produced by the circuits 141, 142 and 143.

Figure 2:
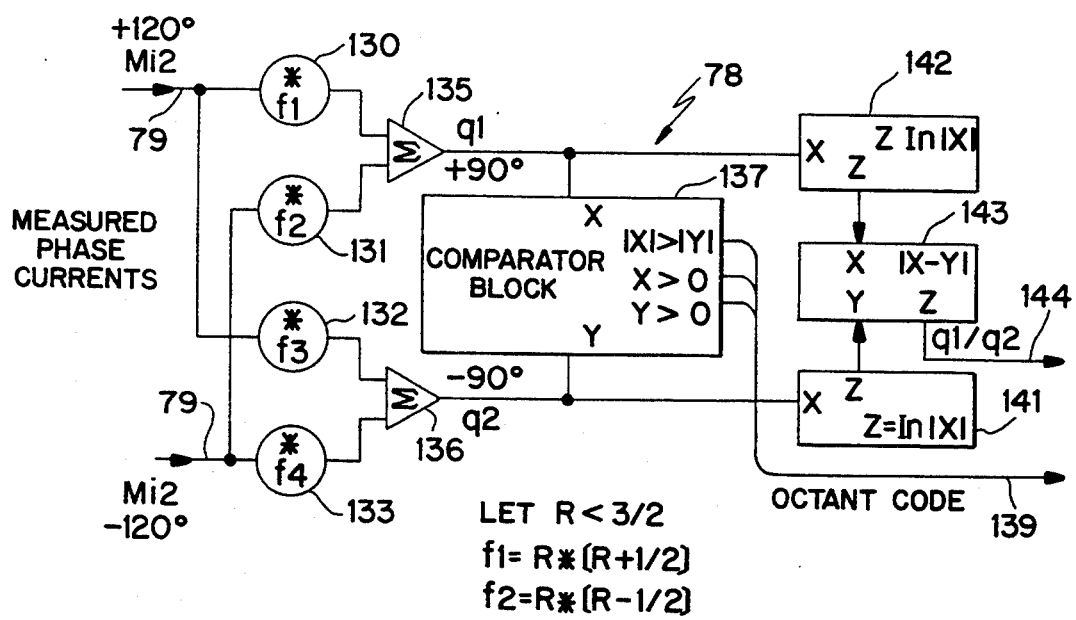
FIG. 2 is a block diagram for converting from rectangular to polar co-ordinates used in the embodiment of FIG. 1.
Figure 6:
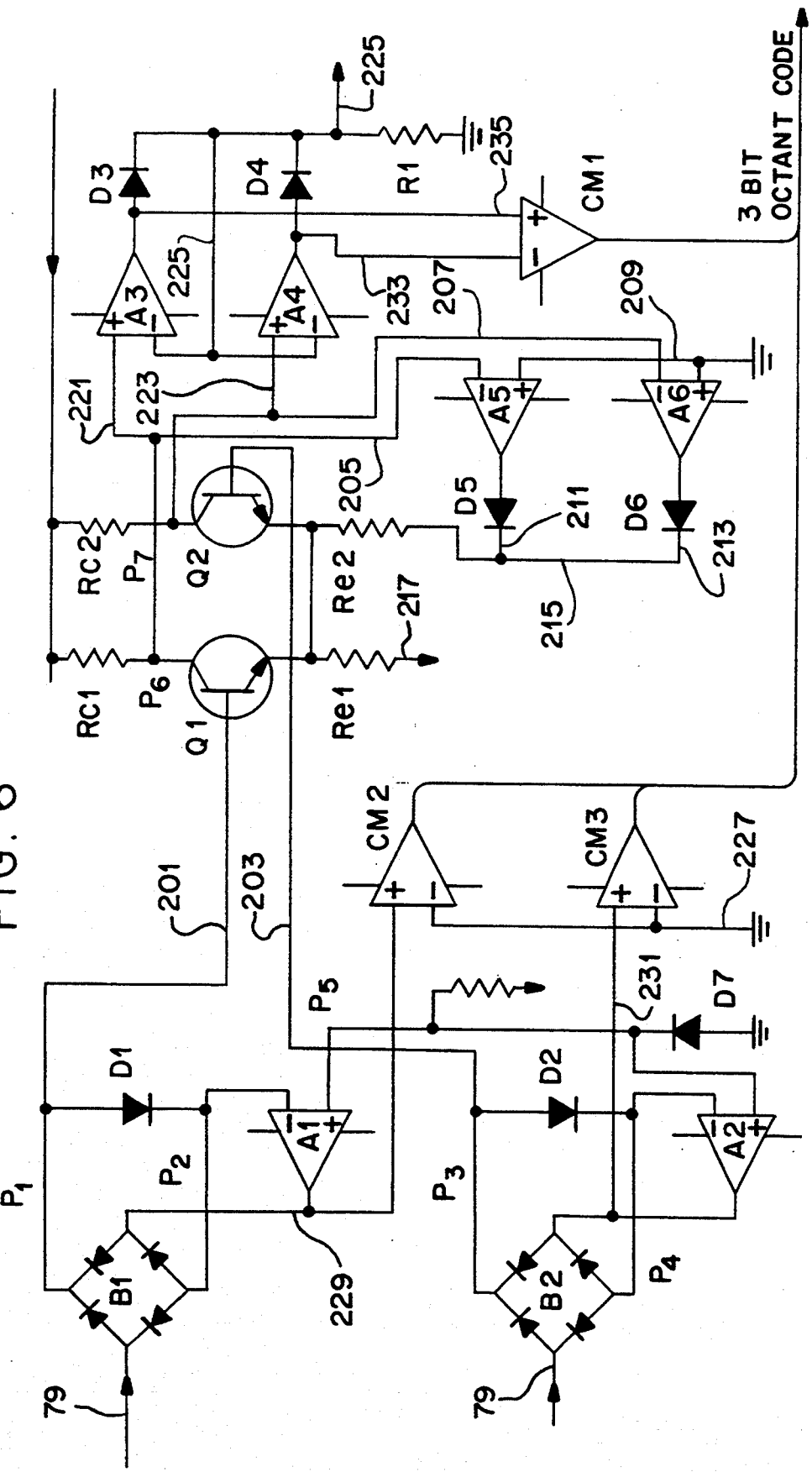
FIG. 6 is a circuit diagram of the block diagram shown in FIG. 2.

FIGS. 6 and 7 show two full circuit diagrams for implementing the concept shown in the block diagram of FIG. 2. Referring firstly to FIG. 6 which shows an embodiment where analogue division is performed using exponential voltage/current characteristics of p-n junctions. The input currents I1 and I2 on lines 79 represent the two quadrature input signals. Bridge rectifiers B1 and B2 rectify these currents and channel them through diodes D1 and D2 respectively. Amplifiers A1 and A2 are used to establish the voltages at points P2 and P4 very near that of an arbitrary reference voltage at point P5. The voltages across diodes D1 and D2 are proportional to the logarithm of the magnitude of the currents I1 and I2 respectively. The currents at points P1 and P3 are supplied to the bases of transistors Q1 and Q2 respectively by lines 201 and 203. The collectors of the transistors Q1 and Q2 are connected to a reference voltage by resistors RC1 and RC2 and one input of amplifiers A5 and A6 via lines 205 and 207 respectively. The other inputs to amplifiers A5 and A6 are connected to ground via line 209. The output from the amplifiers A5 and A6 are connected to diodes D5 and D6 on lines 211 and 213 and the lines 211 and 213 are connected to line 215 which are, in turn, connected to the emitters of the transistors Q1 and Q2 via resistor RE2. The emitters are also connected to voltage source Vee via line 217 and resistor RE1.

The feedback amplifiers A5 and A6 with their respective output diodes D5 and D6 ensure that the lower of the two voltages at points P6 and P7 is at zero volts, the other (higher) voltage is then proportional to Vref and the logarithm of the difference between the base voltages of transistors Q1 and Q2. This higher voltage is, from these relationships, proportional to either of the quotients :I1/I2:, whichever is larger. The collectors of the transistors Q1 and Q2 are connected to one input of amplifiers A3 and A4 via lines 221 and 223 respectively. The other inputs are connected to ground via line 225 which, in turn, is coupled with the output from the amplifiers A3 and A4 via diodes D3 and D4. The amplifiers A3 and A4 together with the diodes D3 and D4 select the higher voltage referred to above from the transistors Q1 or Q2 and provide an output on line 225.

Comparators CM2 and CM3 have one input connected to ground via line 227 and their other inputs respectively connected to the output of amplifiers A1 and A2 and to the bridge rectifiers B1 and B2 via lines 229 and 231. A further comparator CM1 is also connected to the outputs of the amplifiers A3 and A4 via lines 233 and 235. The output from the three comparators CM1, CM2 and CM3 provide a binary code indicating which octane contains the input phase angle between currents I1 and I2.

The abovementioned proportionalities also include temperature dependencies which cancel if the diodes D1 and D2 and transistors Q1 and Q2 are similar and on a common monolithic substrate.

The second embodiment shown in FIG. 7 is similar to the embodiment mentioned above except that it is intended to be used when ratiometric inputs to the analogue to digital converter are available. In this embodiment the octant code generation and magnitude derivation is similar to the first embodiments, except that the logarithmetic elements comprising diodes D1 and D2 and transistors Q1 and Q2 are replaced by resistors RD1 and RD2. The division operation is, in this case, performed by the analogue to digital converter 250.

Figure 3:
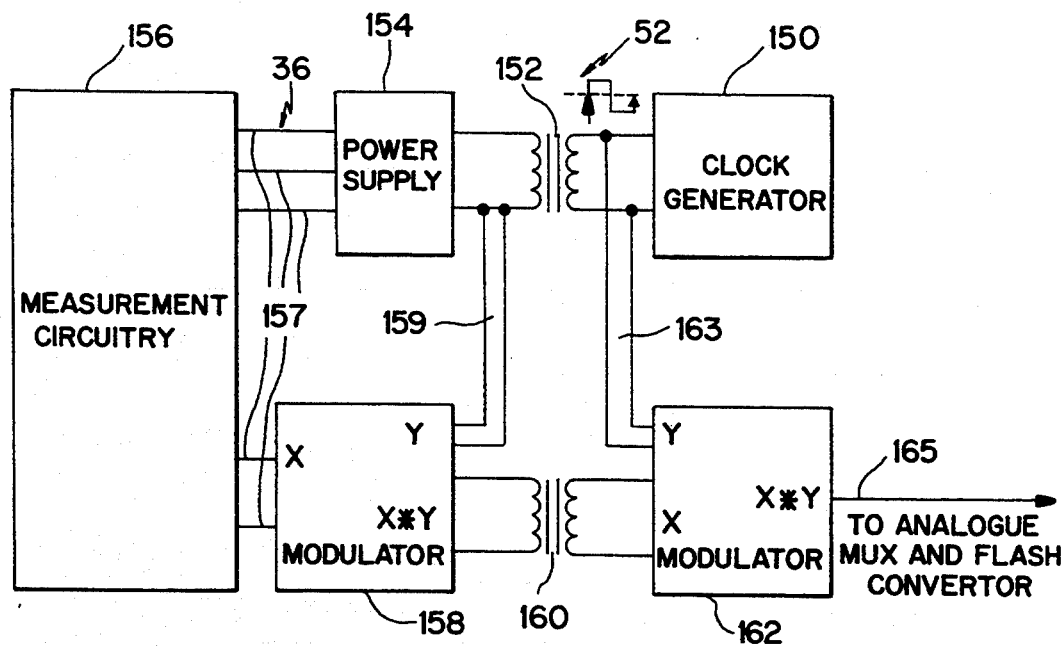
FIG. 3 is a view of an isolator used in the embodiment of FIG. 1.

The isolator circuit 52 is shown in FIG. 3 and comprises a clock generator 150 which provides an AC signal, for example in the form of a square wave to transformer 152. The transformer is also coupled to a power supply 154 which supplies power to measurement circuitry 156 via the lines 157. The measurement circuit is required to measure the voltage difference on the lines 20 in FIG. 1. The measurement signals are applied on one of the lines 157 to a switch modulator circuit 158 which is controlled by the clock generator 150 via lines 159. The switch 158 is connected to one winding of a transformer 160 and the other winding of the transformer 160 is connected to a second switch modulator 162 which is controlled by lines 163 from the clock generator 150. The switching modulators 158 and 162 switch over so that the two inputs on line 157 are switched between the ends of the first winding to which the bridge 158 is connected and to the second winding to which the switch 162 is connected. The voltage which is applied on the lines 36, to the first winding of the transformer 160 is followed by the second winding of the transformer 160 to reconstruct that signal output 165 from the switch 162 for application to the multiplexer 54. Thus, the relevant data signal is transmitted to the processing section 50 but the processing section 50 is isolated by the transformer 160 by the high voltages applied on lines 36.

Figure 4:
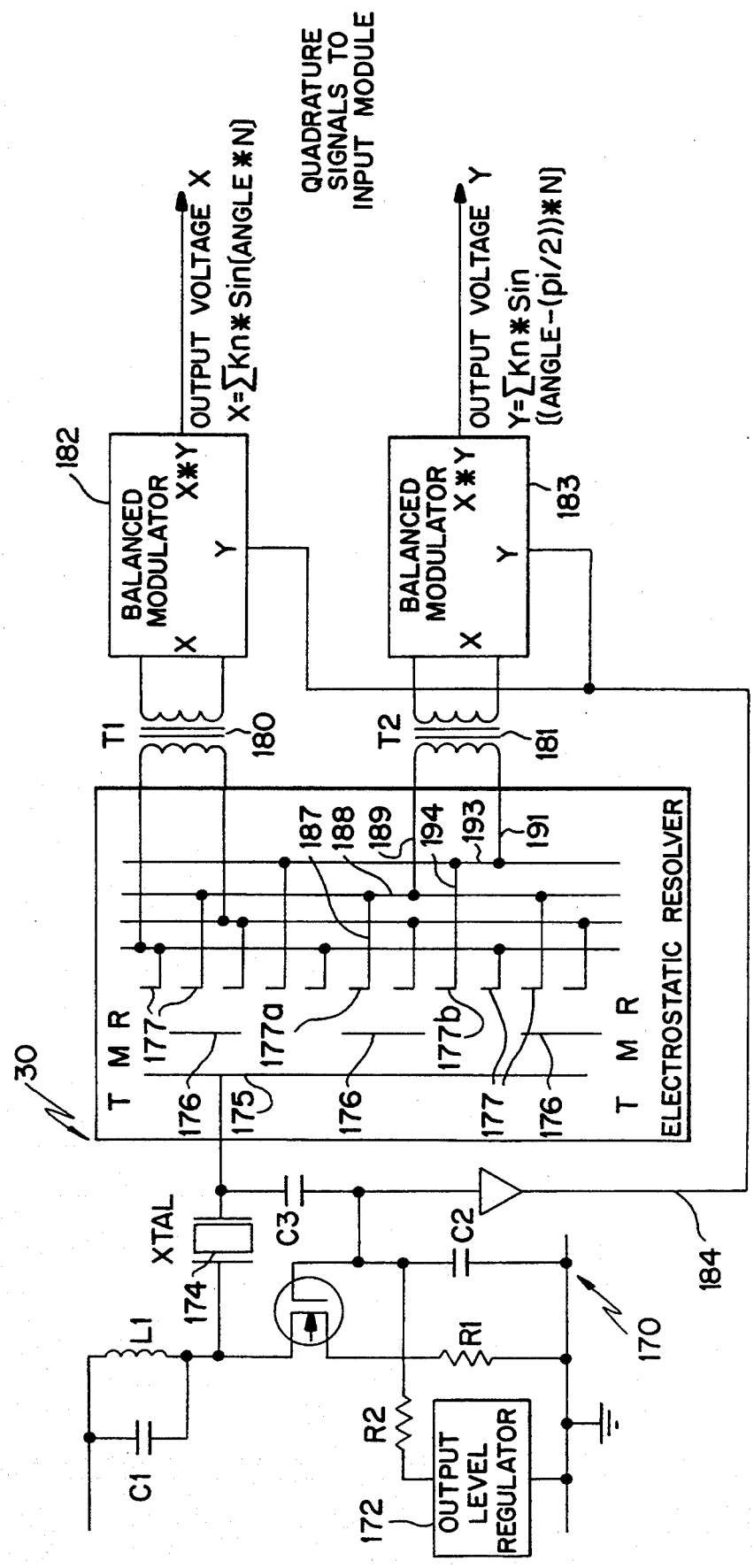
FIG. 4 is a view of a device for the turn of the angular position of the motor controlled by the controller.

FIG. 4 shows the device 30 for measuring the angular position of the motor M. The device 30 includes an oscillator 170 which has an output level regulator 172 and a step-up crystal supply 174 which is coupled to a plate 175 which is generally fixed in close proximity to a moving part of the motor M. The moving part of the motor M is provided with a plurality of plates 176 and arranged on the other side of the moving plates 176 to the plate 175 is a plurality of plates 177. The number of plates 177 is greater than the number of plates 176 and the plates 177 are coupled to transformers 180 and 181 as shown. The transformers 180 and 181 are coupled to balanced modulator circuits 182 and 183. Furthermore, power supply signal generally applied to plate 175 is also supplied by a line 184 to the balanced modulators 182 and 183.

As the motor M rotates the plates 176 move thereby altering the electric flux and the current which is produced in the plates 177 by the plate 175. In the position shown in FIG. 4 current is supplied from the plate marked 177A via line 187, 188 and 189 to transformer 181 and to earth via line 191, line 193 and line 194 to plate 177B which, in the position shown in FIG. 1 effectively is earthed. As the moving plates 176 pass the plates 177 the current changes thereby changing the signal applied by the transformers 180 and 181 to the balanced modulators 182 and 183. The signals therefore change in a sinusoidal manner and the signals provided by the transformers 180 and 181 are time shifted relative to one another. By combining the signals outputted from the transformers 181 and 180 with the reference signals supplied by the isolator 170 the signals X and Y can be generated which provide an indication of the angular position of the motor M. These signals are shown as X and Y in FIG. 4 and it is these signals which are processed by the circuit shown in FIG. 2 to convert from rectangular co-ordinates to polar co-ordinates.

Figure 5A:
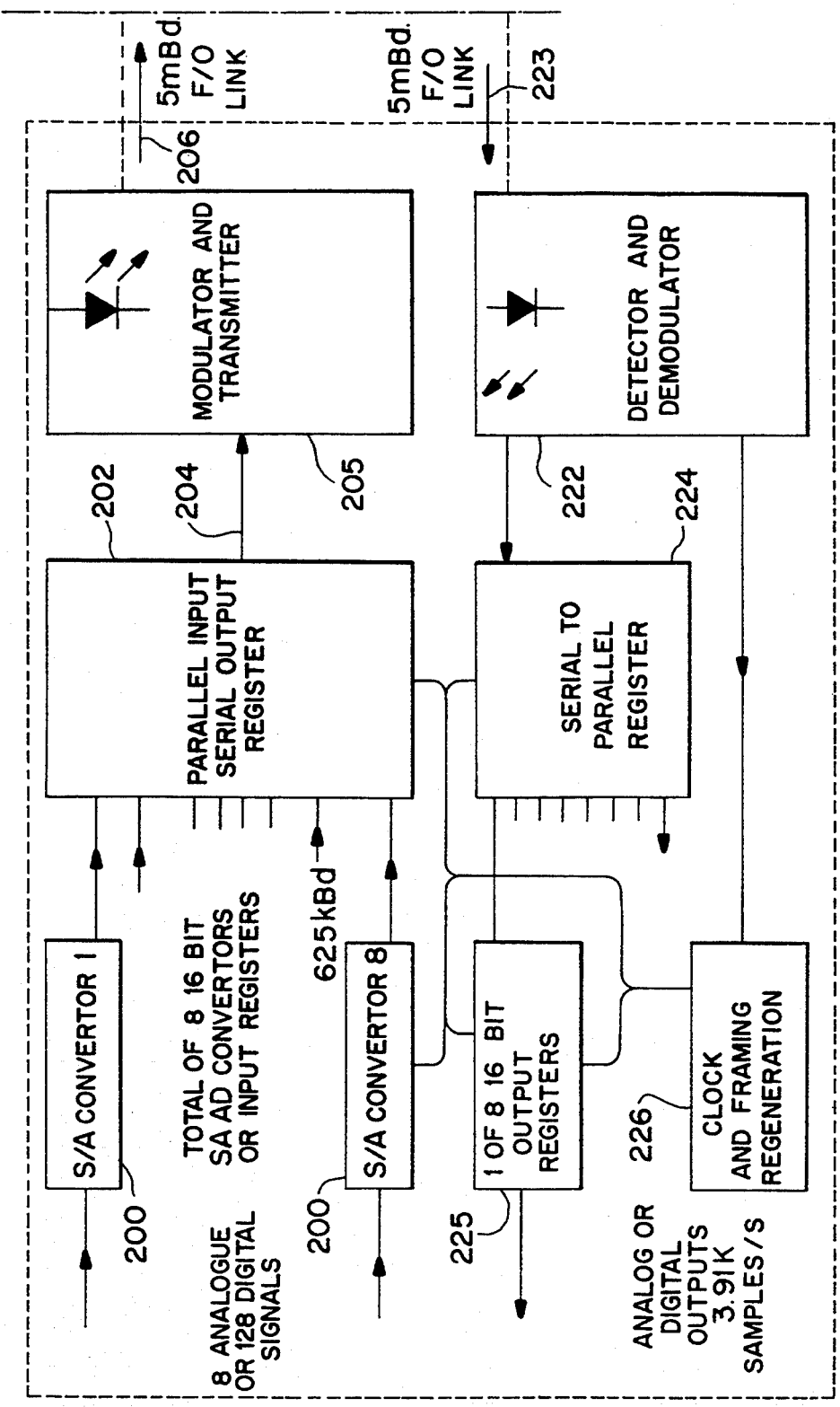
FIGS. 5A and 5B are views of a multiplexer/demultiplexer circuit for receiving and transferring data signals detected by the controller of FIG. 1.
Figure 5B:
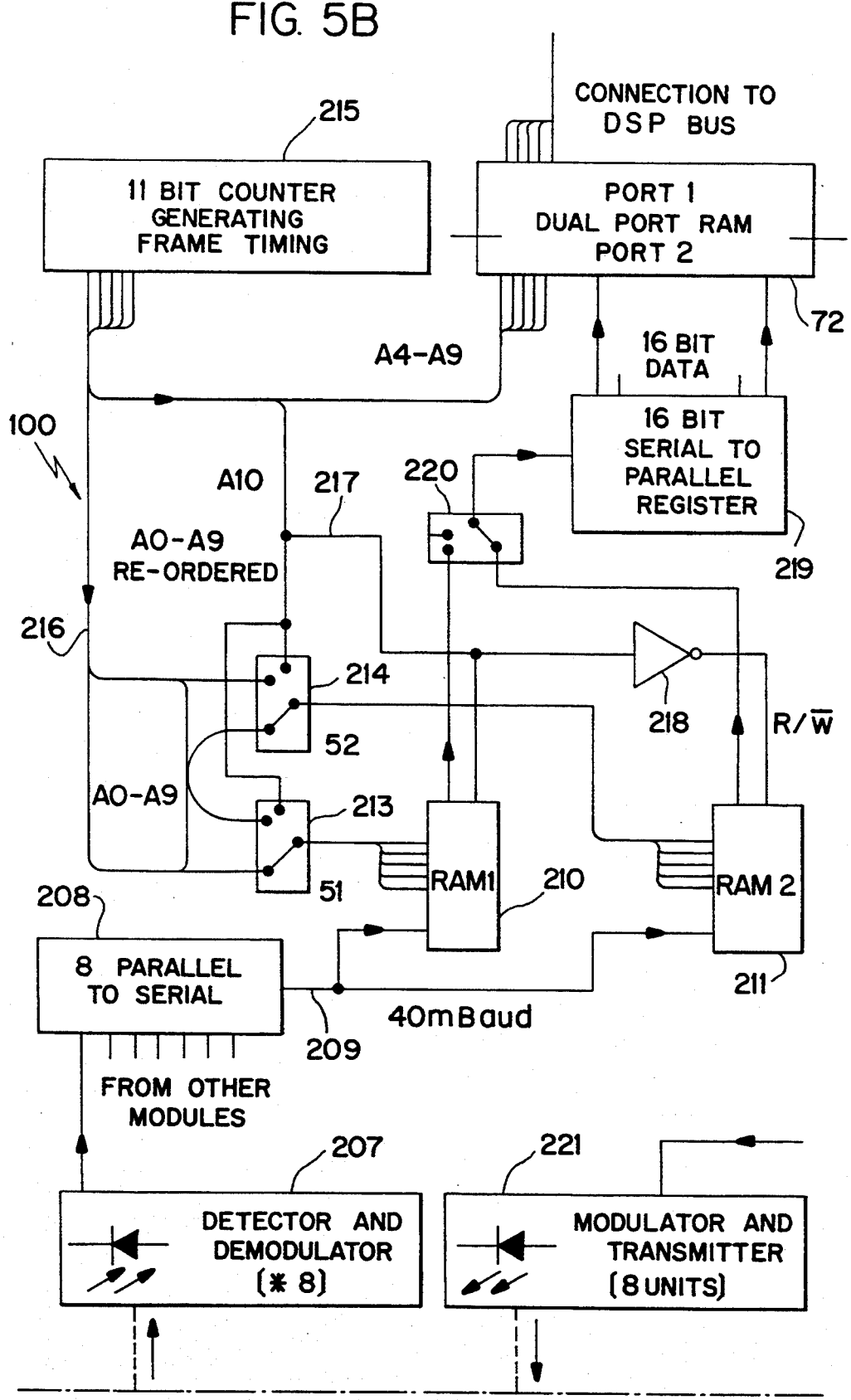

FIGS. 5A and 5B show a detailed diagram of the circuit 100 for effectively reshuffling the large amount of data signals applied to the circuit 100 that they can be easily transmitted in serial fashion and then reshuffled so that they are reconstructed in the form originally supplied to the circuit 100 for application to the memory 72 and processing by the processor 70. The fibre optic lines from the input/output modules 32 and 34 are coupled to a plurality of sets of SA converters 200. In other embodiments digital input circuits could be used in place of the converters if the signals are already in digital form. For ease of illustration only one set is shown in FIG. 1. Each set of SA converters is coupled to a parallel input serial output register 202 so that the first bit of information from each converter 200 is inputted into the serial register and then outputted from the serial register in serial form on line 204. The second bit of information in each register 200 is then inputted into the serial register 202 and outputted as a serial line in line 204. Thus, the information in each of the converters 200 is effectively shuffled up in the serial register circuits 202 and outputted as a single line 204 to modulator and transmitters 205 (only one shown). The modulator and transmitters 205 then output the information on fibre optic links 206 to a detector and demodulator circuits 207 (only one shown).

The data from each of the detector modules 207 is fed into a further parallel to serial register 208 where the bit stream are further interleaved to form a serial output on line 209 which is coupled to a first ram 210 and a second ram 211. The two rams 210 and 211 are coupled to switches 213 and 214 respectively, which are in turn coupled to counter 215 via an address bus 216. The master data bus 216 is also coupled to line 217 which is coupled to the rams 210 and 211 so that data is fed into either of the rams 210, 211 depending on the state of the line 217 of the bus 216. The line 217 is branched and one branch includes an inverter 218 so that the rams 210 and 211 alternately receive and transmit data.

The switches 213 and 214 are also coupled to the bus 216 and switch the addresses on the rams 210 and 211 so that the order of addresses on reading is different to that on writing. This reshuffles the data stream so that each word transmitted to a serial to parallel register 219 and then to the dual port ram 72 (also shown in FIG. 1) contains the results of a given conversion. Thus, the addresses received by the rams 210 and 211 effectively reshuffle the data which is received in serial form by the rams so that the actual data words applied to the converters 200 is reconstructed and applied to the shift register 219 and then to the dual port memory 72. A switch 220 is provided between the register 219 and the rams 210 and 211 and the switches between the rams so that there outputs are fed to the register 219.

Control data which is outputted by the dual port memory and the control of the central processor 70 is similar to that for the input path and therefore will not be further described. However, the data is received by transmitter 221 and transmitted to a detector modulator 222 by fibre optical link 223. That data is then fed to a serial to parallel register 224 where the serial data is outputted in parallel form to a plurality of output registers 225 (only one of which is shown). A clock and framing generator 226 is utilized to control the registers and converters.

Since modification within the spirit and scope of the invention may readily be effected by persons skilled within the art, it is to be understood that this invention is not limited to the particular embodiment described by way of example hereinabove.

I claim:

1. A device for receiving and transferring a plurality of parallel signals, comprising:
   a plurality of sets of input means for receiving the plurality of parallel signals, each of the parallel signals containing plural pieces of data;
   a first set of register means coupled to the plurality of sets of input means for receiving the plurality of parallel signals from the input means, and each register means in the first set of register means for outputting a first serial output signal to thereby provide a plurality of first serial output signals from the first set of register means, each of the first serial output signals containing data from the plurality of parallel signals in a shuffled form;
   transfer means for transferring said plurality of serial output signals from the first set of register means;
   a second register means for receiving the first plurality of serial output signals from the transfer means and for outputting a second serial output signal, the data from the plurality of parallel signals being further interleaved in the second serial output signal;
   at least one memory means for receiving the second serial output signal and therefore the interleaved data from the plurality of parallel input signals contained in the second serial output signal; and
   address means for addressing said at least one memory means for causing said at least one memory means to reconstruct said plurality of parallel input signals so that the data stored in said at least one memory means is reconstructed back into the form in which the data is received in the plurality of parallel signals received by the input means.

2. The device of claim 1 wherein said input means are converters or digital signal input circuits.

3. The device of claim 1 or 2 wherein the memory means comprises two memories, the data from said second register means being loaded into each of said memories,
   first switch means for switching between said memories so that one memory receives data from said second register means while the other memory outputs data,
   second switch means connected to the two memories for switching between said two memories so that data outputted from said memories is selectively applied to a third register means.

* * * * *